US010253194B2

(12) United States Patent
Yoshimasa et al.

(10) Patent No.: US 10,253,194 B2
(45) Date of Patent: Apr. 9, 2019

(54) INK, INK CARTRIDGE, AND IMAGE RECORDING METHOD

(71) Applicant: CANON KABUSHIKI KAISHA, Tokyo (JP)

(72) Inventors: Yutaka Yoshimasa, Yokohama (JP); Masahiro Terada, Hadano (JP); Hidetaka Kawamura, Yokohama (JP); Akihiro Taya, Yokohama (JP); Yohei Masada, Tokyo (JP); Masanobu Ootsuka, Tokyo (JP); Takaharu Aotani, Tokyo (JP); Shoji Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 15/281,140

(22) Filed: Sep. 30, 2016

(65) Prior Publication Data

US 2017/0210919 A1 Jul. 27, 2017

(30) Foreign Application Priority Data

Jan. 22, 2016 (JP) .................. 2016-010900

(51) Int. Cl.
*C09D 11/037* (2014.01)
*B41J 2/01* (2006.01)
(Continued)

(52) U.S. Cl.
CPC .............. *C09D 11/037* (2013.01); *B41J 2/01* (2013.01); *C09D 11/033* (2013.01);
(Continued)

(58) Field of Classification Search
None
See application file for complete search history.

(56) References Cited

U.S. PATENT DOCUMENTS 4,557,761 A 12/1985 Kobayashi et al.
4,632,703 A 12/1986 Koike et al.
(Continued)

FOREIGN PATENT DOCUMENTS

EP 2 862 907 A1 4/2015
EP 2 889 344 A1 7/2015
(Continued)

OTHER PUBLICATIONS

US 5,123,959 A, 06/1992, Fukushima et al. (withdrawn)
(Continued)

*Primary Examiner* — Erica S Lin
(74) *Attorney, Agent, or Firm* — Venable LLP (57) ABSTRACT

There is provided an ink including a pigment, resin particles, a surfactant, water-soluble organic compound, and water, in which: the content of the water-soluble organic compounds is 35 mass % or less based on a total mass of the ink; the water-soluble organic compound contains a first water-soluble organic compound being liquid at 25° C. and having a surface tension at 25° C. of 40 mN/m or less, and the content of the first water-soluble organic compound is 5 mass % or less based on a total mass of the ink; and the surfactant is a surfactant represented by the following formula (1):

$$R_1\text{---}CH\text{---}(CH_2)_{\overline{x}}\text{---}\underset{\underset{HO\text{---}(CH_2CH_2O)_m}{|}}{\overset{\overset{R_2}{|}}{C}}\text{---}\overset{CH_3}{\underset{|}{C}}\text{---}C\equiv C\text{---}\overset{CH_3}{\underset{|}{C}}\text{---}(CH_2)_{\overline{y}}\text{---}\underset{\underset{[OCH_2CH_2]_{\overline{n}}\text{---}OH}{}}{\overset{\overset{R_3}{|}}{CH}}\text{---}R_4. \quad (1)$$

15 Claims, 1 Drawing Sheet

(51) Int. Cl.
  *C09D 11/033* (2014.01)
  *C09D 11/102* (2014.01)
  *C09D 11/107* (2014.01)
  *C09D 11/322* (2014.01)
  *C09D 11/324* (2014.01)
  *C09D 11/38* (2014.01)

(52) U.S. Cl.
  CPC .......... *C09D 11/102* (2013.01); *C09D 11/107* (2013.01); *C09D 11/322* (2013.01); *C09D 11/324* (2013.01); *C09D 11/38* (2013.01)

(56) References Cited

U.S. PATENT DOCUMENTS

| | | | |
|---|---|---|---|
| 4,661,158 A | 4/1987 | Kobayashi et al. |
| 4,689,078 A | 8/1987 | Koike et al. |
| 4,702,742 A | 10/1987 | Iwata et al. |
| 4,725,849 A | 2/1988 | Koike et al. |
| 4,838,938 A | 6/1989 | Tomida et al. |
| 4,849,770 A | 7/1989 | Koike et al. |
| 4,853,036 A | 8/1989 | Koike et al. |
| 4,923,515 A | 5/1990 | Koike et al. |
| 4,957,553 A | 9/1990 | Koike et al. |
| 4,965,609 A | 10/1990 | Tomida et al. |
| 4,965,612 A | 10/1990 | Sakaki et al. |
| 4,969,951 A | 11/1990 | Koike et al. |
| 4,973,499 A | 11/1990 | Iwata et al. |
| 4,986,850 A | 1/1991 | Iwata et al. |
| 5,017,227 A | 5/1991 | Koike et al. |
| 5,053,078 A | 10/1991 | Koike et al. |
| 5,067,980 A | 11/1991 | Koike et al. |
| 5,075,699 A | 12/1991 | Koike et al. |
| 5,099,255 A | 3/1992 | Koike et al. |
| 5,101,217 A | 3/1992 | Iwata et al. |
| 5,118,351 A | 6/1992 | Shirota et al. |
| 5,124,718 A | 6/1992 | Koike et al. |
| 5,141,558 A | 8/1992 | Shirota et al. |
| 5,151,128 A | 9/1992 | Fukushima et al. |
| 5,190,581 A | 3/1993 | Fukushima et al. |
| 5,220,347 A | 6/1993 | Fukushima et al. |
| 5,221,333 A | 6/1993 | Shirota et al. |
| 5,248,991 A | 9/1993 | Shirota et al. |
| 5,250,121 A | 10/1993 | Yamamoto et al. |
| 5,254,157 A | 10/1993 | Koike et al. |
| 5,257,036 A | 10/1993 | Koike et al. |
| 5,258,066 A | 11/1993 | Kobayashi et al. |
| 5,296,022 A | 3/1994 | Kobayashi et al. |
| 5,329,305 A | 7/1994 | Fukushima et al. |
| 5,358,558 A | 10/1994 | Yamamoto et al. |
| 5,380,358 A | 1/1995 | Aoki et al. |
| 5,396,275 A | 3/1995 | Koike et al. |
| 5,468,553 A | 11/1995 | Koike et al. |
| 5,494,733 A | 2/1996 | Koike et al. |
| 5,500,023 A | 3/1996 | Koike et al. |
| 5,515,093 A | 5/1996 | Haruta et al. |
| 5,540,764 A | 7/1996 | Haruta et al. |
| 5,594,485 A | 1/1997 | Koike et al. |
| 5,645,631 A | 7/1997 | Koike et al. |
| 5,658,376 A | 8/1997 | Noguchi et al. |
| 5,686,951 A | 11/1997 | Koike et al. |
| 5,698,478 A | 12/1997 | Yamamoto et al. |
| 5,718,793 A | 2/1998 | Inamoto et al. |
| 5,764,261 A | 6/1998 | Koike et al. |
| 5,781,216 A | 7/1998 | Haruta et al. |
| 5,782,967 A | 7/1998 | Shirota et al. |
| 5,902,387 A | 5/1999 | Suzuki et al. |
| 5,922,625 A | 7/1999 | Haruta et al. |
| 6,033,066 A | 3/2000 | Koike et al. |
| 6,036,307 A | 3/2000 | Hakamada et al. |
| 6,139,939 A | 10/2000 | Haruta et al. |
| 6,214,963 B1 | 4/2001 | Noguchi et al. |
| 6,394,597 B1 | 5/2002 | Koike et al. |
| 6,398,355 B1 | 6/2002 | Shirota et al. |
| 6,426,766 B1 | 7/2002 | Shirota et al. |
| 6,474,803 B1 | 11/2002 | Shirota et al. |
| 6,552,156 B2 | 4/2003 | Noguchi et al. |
| 6,613,821 B2 | 9/2003 | Suzuki et al. |
| 6,619,791 B2 | 9/2003 | Tochihara et al. |
| 6,676,254 B2 | 1/2004 | Nagashima et al. |
| 6,698,876 B2 | 3/2004 | Sato et al. |
| 6,723,137 B1 | 4/2004 | Hakamada et al. |
| 6,874,881 B2 | 4/2005 | Suzuki et al. |
| 6,932,467 B2 | 8/2005 | Kawamura |
| 7,029,109 B2 | 4/2006 | Shirota et al. |
| 7,055,943 B2 | 6/2006 | Suzuki et al. |
| 7,141,105 B2 | 11/2006 | Udagawa et al. |
| 7,144,449 B2 | 12/2006 | Udagawa et al. |
| 7,185,978 B2 | 3/2007 | Nagashima et al. |
| 7,306,664 B2 | 12/2007 | Kato et al. |
| 7,429,291 B2 | 9/2008 | Udagawa et al. |
| 7,449,056 B2 | 11/2008 | Kato et al. |
| 7,464,965 B2 | 12/2008 | Udagawa et al. |
| 7,605,124 B2 | 10/2009 | Masada et al. |
| 7,611,570 B2 | 11/2009 | Koike et al. |
| 7,641,723 B2 | 1/2010 | Koike et al. |
| 7,827,982 B2 | 11/2010 | Masada et al. |
| 7,926,931 B2 | 4/2011 | Katsuragi et al. |
| 8,029,609 B2 | 10/2011 | Masada et al. |
| 8,308,198 B2 | 11/2012 | Udagawa et al. |
| 8,328,341 B2 | 12/2012 | Koike et al. |
| 8,328,926 B2 | 12/2012 | Koike et al. |
| 8,408,691 B2 | 4/2013 | Koike et al. |
| 8,506,067 B2 | 8/2013 | Koike et al. |
| 2005/0054751 A1* | 3/2005 | Namba ................. C09D 11/322 523/160 |
| 2007/0221215 A1 | 9/2007 | Sugita et al. |
| 2010/0302326 A1* | 12/2010 | Morohoshi ............ B41J 2/1433 347/86 |
| 2013/0222462 A1 | 8/2013 | Okubo et al. |
| 2013/0258011 A1* | 10/2013 | Boris ................... C09D 11/322 347/100 |
| 2014/0204156 A1* | 7/2014 | Gotou ...................... B41J 2/01 347/100 |
| 2014/0313265 A1 | 10/2014 | Himura et al. |
| 2014/0368572 A1 | 12/2014 | Goto |

FOREIGN PATENT DOCUMENTS

| | | |
|---|---|---|
| JP | 2009-226850 A | 10/2009 |
| JP | 2011-127001 A | 6/2011 |

OTHER PUBLICATIONS

Nov. 24, 2016 European Search Report in European Patent Appln. No. 16191791.9.

"Method of Testing Paper and Paperboard for their Liquid-Absorbing Properties", Japan TAPPI Paper Pulp Test Method, No. 51, pp. 1-6.

* cited by examiner

INK, INK CARTRIDGE, AND IMAGE RECORDING METHOD

BACKGROUND OF THE INVENTION

Field of the Invention

The present invention relates to an ink, an ink cartridge, and an image recording method.

Description of the Related Art

An inkjet recording method is one of the image recording methods that have been significantly developing in recent years because a high-quality color image can be easily recorded by the method despite the fact that its principle is simple. In addition, the method has rapidly become widespread not only in the image recording of a document, a photograph, and the like in households that has heretofore been mainstream but also in offices and industrial applications.

In the case of a printer for a household or for an office, printing is performed by scanning the recording surface of a recording medium with a short serial type head a plurality of times, and hence a printing speed is limited. Meanwhile, a long line type head has been developed in recent years. When a recording apparatus, such as a printer, mounted with such line type head is used, an image of a size corresponding to a head width can be recorded by one scan (one pass). Accordingly, the inkjet recording method has started to be adopted also in a commercial printing industry where printing at higher speed is required.

In the commercial printing industry, it is necessary that a large amount of images can be printed at lower cost. Accordingly, it has been desired that a high-quality image can be recorded also on inexpensive and thin paper that has been generally called printing paper and has been widely used. However, in the case of paper classified as woodfree paper or fine coating paper, an ink is liable to permeate into the paper and hence its strike-through is liable to be conspicuous. Accordingly, in the commercial printing industry where duplex printing is often performed, it has been a large challenge to record a high-quality image at high speed while suppressing the strike-through to the extent possible.

The simplest method of suppressing the strike-through is a method involving reducing the ejection amount of the ink per unit area of a recording medium (paper). However, the reduction in ejection amount of the ink makes it difficult to completely conceal the surface of the paper, and is hence liable to cause a problem, such as the occurrence of a stripe in a solid image. In the case of a pigment ink to be frequently used in commercial printing, a dot diameter after printing is liable to be smaller than that of a dye ink. Accordingly, a reduction in ejection amount of the pigment ink more remarkably causes a problem, such as the occurrence of a stripe in a solid image.

A method for the suppression of strike-through and the occurrence of a stripe is a method involving increasing the ejection amount of an ink to forcibly expand a dot diameter to suppress the permeation of the ink after its impingement into a recording medium. For example, the following image recording method has been proposed (Japanese Patent Application Laid-Open No. 2009-226850). A treatment liquid containing a component for aggregating a pigment in an ink (aggregation component) is applied to a recording medium in advance, and the permeation of the ink into the recording medium is suppressed by causing the ink after its impingement and the aggregation component to react with each other. In addition, an ink set containing an ink having the following feature has been proposed (Japanese Patent Application Laid-Open No. 2011-127001). The ink is increased in surface tension so that its permeation into a recording medium may be suppressed, and hence its strike-through can be reduced.

SUMMARY OF THE INVENTION

The present invention is directed to provide an ink having the following features: even when the ejection amount of the ink is not increased, a dot diameter can be expanded; and the ink can record an image having satisfactory concealment and suppressed in strike-through. The present invention is also directed to provide an ink cartridge and an image recording method each using the ink.

According to one embodiment of the present invention, there is provided an ink, including a pigment, resin particles, a surfactant, a water-soluble organic compound, and water, in which: a content of the water-soluble organic compound is 35 mass % or less with reference to a total mass of the ink; the water-soluble organic compound contains a first water-soluble organic compound that is liquid at 25° C. and has a surface tension at 25° C. of 40 mN/m or less, and a content of the first water-soluble organic compound is 5 mass % or less with reference to the total mass of the ink; the surfactant includes a surfactant represented by the following general formula (1); a content of the surfactant is 0.7 mass % or more with reference to the total mass of the ink; a mass ratio of the content (mass %) of the surfactant to a total of a content (mass %) of the pigment and a content (mass %) of the resin particles is 0.25 or less; and the ink has a surface tension at 25° C. of 25 mN/m or more and 35 mN/m or less:

in the general formula (1), $R_1$ to $R_4$ each independently represent an alkyl group having 1 to 3 carbon atoms, x and y each independently represent a numerical value of from 1 to 5, and m+n represents a numerical value of from 0 to 7.

According to another embodiment of the present invention, there is provided an ink cartridge, including an ink and an ink storage portion configured to store the ink, the ink including the above-mentioned ink.

According to still another embodiment of the present invention, there is provided an image recording method, including an ink-applying step of applying an ink to a recording medium, the ink including the above-mentioned ink.

Further features of the present invention will become apparent from the following description of exemplary embodiments with reference to the attached drawings.

DESCRIPTION OF THE EMBODIMENTS

In the case of the image recording method proposed in Japanese Patent Application Laid-Open No. 2009-226850, the construction of a recording apparatus becomes complicated, or the recording medium (paper) deforms depending on, for example, the composition of the treatment liquid in some cases. In addition, in the case where the treatment liquid is used, a dot diameter becomes smaller than that in the case where the treatment liquid is not used, and hence the ejection amount of the ink needs to be further increased for suppressing the occurrence of a stripe. Accordingly, it cannot be said that the method is efficient in terms of an environment and cost.

In addition, the ink constituting the ink set proposed in Japanese Patent Application Laid-Open No. 2011-127001 remains on the surface of a recording medium for a long time period, and hence the fixation of an image is liable to be slow. When the fixation of the image becomes slow, the following problem is liable to occur: contamination in which the ink adheres to a portion constituting a recording apparatus, such as a paper-conveying portion, or the like occurs. Accordingly, it is difficult to correspond to high-speed printing in a commercial printing industry.

The inventors of the present invention have made extensive investigations with a view to providing an ink having the following features: even when the ejection amount of the ink is not increased, a dot diameter can be expanded; and the ink can record an image having satisfactory concealment and suppressed in strike-through. As a result, the inventors have reached the present invention.

An embodiment of the present invention is described below, but the present invention is not limited to the following embodiment. Various physical property values herein are values at normal temperature (25° C.) unless otherwise stated. The inventors of the present invention have made extensive investigations on an ink containing a pigment and resin particles, the ink having the following features: even when the ejection amount of the ink is not increased, a dot diameter can be expanded; and the ink can record an image having satisfactory concealment and suppressed in strike-through. As a result, the inventors have found that such problems as described above can be solved by further incorporating a predetermined amount of each of a specific surfactant and a specific water-soluble organic compound. Thus, the inventors have completed the present invention.

The inventors of the present invention have first set the content of a water-soluble organic compound in the ink to 35 mass % or less. Further, the inventors have set the content of a "first water-soluble organic compound" that is liquid at 25° C. and has a surface tension at 25° C. of 40 mN/m or less out of the water-soluble organic compound to 5 mass % or less. It has been found that strike-through can be effectively suppressed by setting the total content of the water-soluble organic compound and the content of the first water-soluble organic compound as described above. It is probably because of the following reason that the strike-through can be effectively suppressed as described above: the content of the water-soluble organic compound that has a surface tension lower than that of water and is liable to permeate into a recording medium, such as paper, is set to a predetermined value or less. A water-soluble organic compound having a lower surface tension is more liable to permeate into the recording medium, such as paper. Accordingly, in the ink of the present invention, the content of the first water-soluble organic compound having a surface tension of 40 mN/m or less is set to be smaller.

In addition, the inventors of the present invention have made an investigation on a construction in which even when the ejection amount of the ink is not increased, a dot diameter can be expanded, and which is intended for the recording of an image having satisfactory concealment. As a result, it has been found that in the case where a specific surfactant is incorporated in an amount largely exceeding its saturated solubility in water, even when the ejection amount of the ink is not increased, the dot diameter can be expanded. It has been found that such effect as described above is not obtained for all surfactants, and such effect as described above is obtained in the case where a surfactant represented by the following general formula (1) is used.

In the general formula (1), $R_1$ to $R_4$ each independently represent an alkyl group having 1 to 3 carbon atoms, x and y each independently represent a numerical value of from 1 to 5, and m+n represents a numerical value of from 0 to 7.

Although the reason why such effect that in the case where the surfactant represented by the general formula (1) is used, even when the ejection amount of the ink is not increased, the dot diameter can be expanded is obtained is unclear, the inventors of the present invention have assumed the reason to be as described below. The surface of a recording medium, such as printing paper, to be used in commercial printing is hydrophobic because the surface is subjected to a sizing treatment. Therefore, a pigment and resin particles in a related-art ink that has impinged on the recording medium adsorb to the surface of the recording medium through hydrophobic portions on their respective surfaces. The pigment and the resin particles that have adsorbed to the surface of the recording medium cannot move in a horizontal direction. Further, the movement of the entirety of an ink droplet is limited by the effects of hydration and solvation, and hence it may become difficult to expand the dot diameter.

In contrast, the surfactant represented by the general formula (1) has high hydrophobicity and has low solubility in water. Accordingly, the surfactant represented by the general formula (1) that has been added in an amount exceeding its saturated solubility in water to the ink adsorbs to the pigment and the resin particles by virtue of a hydrophobic interaction. When the hydrophobic portion of the surfactant represented by the general formula (1) adsorbs to the pigment and the resin particles, each of the surfaces of the pigment and the resin particles is hydrophilized. Accordingly, the adsorption of the pigment and the resin particles to the surface of a recording medium is suppressed. Probably as a result of the foregoing, the pigment and the resin particles can move in a horizontal direction, and hence the dot diameter is expanded. In addition, the surfactant represented by the general formula (1) contains an acetylene structure and has two hydrophilic chains in its molecular structure. Accordingly, its adsorption force to the pigment and the resin particles is significantly large, and its ability to hydrophilize the surfaces of the pigment and the resin particles is high. Therefore, the use of the surfactant having such structural features may be able to effectively expand the dot diameter.

Further, a feature of the ink of the present invention lies in that the rate at which the ink permeates into a recording medium is controlled within an optimum range so that the rate may not be excessively fast and excessively slow. Specifically, the surface tension of the ink of the present invention at 25° C. is 25 mN/m or more and 35 mN/m or less. When the surface tension is less than 25 mN/m, higher priority is placed on the permeation into the recording medium than on the expansion of the dot diameter, and hence the strike-through is liable to occur. Meanwhile, when the surface tension is more than 35 mN/m, the ink hardly permeates into the recording medium and the dot diameter is reduced.

As described above, by virtue of a synergistic effect between the constituent materials for the ink and the physical properties of the ink, even when the ejection amount is not increased, the dot diameter can be expanded, and an image having satisfactory concealment and suppressed in strike-through can be recorded.

<Ink>

The ink of the present invention contains a pigment, resin particles, a surfactant, a water-soluble organic compound, and water. The components constituting the ink of the present invention, the physical properties of the ink, and the like are described in detail below.

(Pigment)

Any one of the pigments that can be dispersed in water, such as a resin-dispersed pigment and a self-dispersion pigment, may be used as the pigment. Examples of the kind of the pigment may include an inorganic pigment and an organic pigment, and any one of the known pigments that may be used in inks may be used.

Examples of the inorganic pigment may include furnace black, acetylene black, channel black, thermal black, and lamp black. More specifically, commercially available carbon blacks as described below may be used. That is, examples thereof may include carbon blacks available under the following trade names: RAVEN: 7000, 5750, 5250, 5000 ULTRA, 3500, 2000, 1500, 1255, 1250, 1200, 1190 ULTRA-II, and 1170 (that are manufactured by Columbia Carbon Co., Ltd.); MONARCH: 700, 800, 880, 900, 1000, 1100, 1300, 1400, and 2000 (that are manufactured by Cabot); BLACK PEARLS: 880, 800, and L (that are manufactured by Cabot); COLOR BLACK: FW1, FW2, FW2V, FW18, FW200, 5150, S160, and 5170 (that are manufactured by Degussa); PRINTEX: 85, 95, 140U, 140V, U, and V (that are manufactured by Degussa); SPECIAL BLACK: 6, 5, 4A, and 4 (that are manufactured by Degussa); and No. 900, No. 1000, No. 2200B, No. 2300, No. 2350, No. 2400R, and MCF-88 (that are manufactured by Mitsubishi Chemical Corporation). Newly prepared carbon black may also be used.

A cyan pigment, a magenta pigment, a yellow pigment, and the like may each be used as the organic pigment. A copper phthalocyanine pigment is preferably used as the cyan pigment. Specific examples of the copper phthalocyanine pigment may include C.I. Pigment Blue 1, 2, 3, 15, 15:2, 15:3, 15:4, 16, 22, and 60. A quinacridone pigment is preferably used as the magenta pigment. Specific examples of the quinacridone pigment may include C.I. Pigment Red 5, 7, 12, 48, 48:1, 57, 112, 122, 123, 146, 168, 184, 202, and 207. An azo pigment is preferably used as the yellow pigment. Specific examples of the azo pigment may include C.I. Pigment Yellow 12, 13, 14, 16, 17, 74, 83, 93, 95, 97, 98, 114, 128, 129, 151, and 154.

A self-dispersion pigment having a hydrophilic group bonded to the surface of each pigment particle or a resin-dispersed pigment dispersed by a resin dispersant may be used as the pigment. The resin-dispersed pigment may be any one of a resin-dispersed pigment using a resin dispersant, a microcapsule pigment in which the surface of each pigment particle is covered with a resin, and a resin-bonded pigment in which an organic group containing a resin is chemically bonded to the surface of each pigment particle. Pigments different from each other in dispersion method may be used in combination, or two or more kinds of pigments may be used in combination.

The content of the pigment in the ink is preferably 0.1 mass % or more and 10.0 mass % or less, more preferably 1.0 mass % or more and 8.0 mass % or less with reference to the total mass of the ink. When the content of the pigment falls within the range, the optical density of an image to be recorded and the ejection stability of the ink can be further improved.

The total of the content of the pigment in the ink and the content of resin particles to be described later therein is preferably 30 mass % or less, more preferably 20 mass % or less with reference to the total mass of the ink. When the total of the content of the pigment and the content of the resin particles falls within the range, for example, the ejection stability of the ink can be further improved.

[Self-Dispersion Pigment]

The "self-dispersion pigment" in the present invention means a pigment having at least one kind of hydrophilic group bonded directly or via another atomic group (—R—) to the surface of each pigment particle. Examples of the hydrophilic group may include —COOM, —SO$_3$M, —PO$_3$HM, and —PO$_3$M$_2$. In the formulae, "M" preferably represents a hydrogen atom, an alkali metal, ammonium, or an organic ammonium. In addition, "M" in the formulae more preferably represents an alkali metal, such as lithium, sodium, or potassium, because the ejection stability of the ink is improved. In addition, a substituent containing the hydrophilic group and the other atomic group (—R—), the substituent being bonded to the surface of a pigment particle, is preferably a group having a structure represented by —CQ(PO$_3$M$_2$)$_2$. In the formula, "Q" represents R', OR', SR', or NR'$_2$. "R'"s each independently represent a hydrogen atom, an alkyl group, an acyl group, an aralkyl group, or an aryl group. Examples of the alkyl group may include a methyl group and an ethyl group. Examples of the acyl group may include an acetyl group and a benzoyl group. The aralkyl group may be, for example, a benzyl group. Examples of the aryl group may include a phenyl group and a naphthyl group. The substituent containing the hydrophilic group and the other atomic group (—R—), the substituent being bonded to the surface of a pigment particle, is particularly preferably a group having a structure represented by —CH(PO$_3$M$_2$)$_2$.

Examples of the other atomic group (—R—) may include an amide group, an amino group, a ketone group, an ester group, an ether group, an alkylene group having 1 to 12 carbon atoms, a phenylene group, a substituted phenylene group, a naphthylene group, and a substituted naphthylene group. Of those, a group containing —C$_6$H$_4$—CONH— (benzamide structure) or —C$_6$H$_4$—SO$_2$NH— (benzenesulfonamide structure) is preferred as the other atomic group (—R—). A plurality of phosphonic acid groups may be bonded to a carbon atom of the other atomic group (—R—). Specifically, a self-dispersion pigment in which an atomic group having bonded thereto a bisphosphonic acid group or a triphosphonic acid group is bonded to the surface of each pigment particle is preferably used. With regard to the form of the hydrophilic groups in the ink, the groups may be in a state in which part of the groups are dissociated, or may be in a state in which all of the groups are dissociated.

A self-dispersion pigment that is an inorganic pigment may be, for example, a pigment (e.g., self-dispersion carbon black) obtained by introducing a hydrophilic group into the surface of each of known inorganic pigment particles, such as carbon black. Specific examples of the self-dispersion carbon black may include products available under the trade names "CAB-O-JET 200", "CAB-O-JET 300", "CAB-O-JET 352K", and "CAB-O-JET 400" (that are manufactured by Cabot).

A self-dispersion pigment that is an organic pigment may be, for example, a self-dispersion cyan pigment, a self-dispersion magenta pigment, or a self-dispersion yellow pigment obtained by introducing a hydrophilic group into the surface of each of known organic pigment particles. Specific examples of the self-dispersion cyan pigment may include products available under the trade names "CAB-O-JET 250C", "CAB-O-JET 450C", and "CAB-O-JET 554B" (that are manufactured by Cabot). Specific examples of the self-dispersion magenta pigment may include products available under the trade names "CAB-O-JET 260M", "CAB-O-JET 265M", and "CAB-O-JET 465M" (that are manufactured by Cabot). In addition, specific examples of the self-dispersion yellow pigment may include products available under the trade names "CAB-O-JET 270Y", "CAB-O-JET 470Y", and "CAB-O-JET 740Y" (that are manufactured by Cabot).

From the viewpoint of the color developability of an image to be recorded, a phosphonic acid-based self-dispersion pigment having a phosphonic acid group bonded directly or via another atomic group to the surface of each of the particles of the pigment is preferably used as the self-dispersion pigment. A plurality of phosphonic acid groups may be bonded to a carbon atom of the other atomic group (—R—). Specifically, a phosphonic acid-based self-dispersion pigment in which an atomic group having bonded thereto a bisphosphonic acid group or a triphosphonic acid group is bonded to the surface of each pigment particle is preferably used. Of such pigments, a phosphonic acid-based self-dispersion pigment in which an atomic group having bonded thereto a bisphosphonic acid group is bonded to the surface of each pigment particle is particularly preferably used because the color developability of the image to be recorded is improved.

[Resin-Dispersed Pigment]

A resin dispersant that has heretofore been used in an inkjet ink may be used as the resin dispersant in the resin-dispersed pigment. The weight-average molecular weight of the resin dispersant in terms of polystyrene measured by gel permeation chromatography (GPC) is preferably 1,000 or more and 30,000 or less, more preferably 3,000 or more and 15,000 or less. The acid value of the resin dispersant is preferably 50 mgKOH/g or more and 350 mgKOH/g or less, more preferably 80 mgKOH/g or more and 250 mgKOH/g or less. The use of the resin dispersant having an acid value within the range improves the dispersion stability of the pigment and the ejection stability of the ink. The acid value of the resin dispersant may be measured by potentiometric titration.

The content (mass %) of the resin dispersant in the ink is preferably 0.1 mass % or more and 5.0 mass % or less, more preferably 0.5 mass % or more and 3.0 mass % or less with reference to the total mass of the ink. In addition, the mass ratio of the content (mass %) of the pigment in the ink to the content (mass %) of the resin dispersant is preferably 1.0 or more and 10 or less, more preferably 1.5 or more and 7.0 or less, particularly preferably 2.0 or more and 5.0 or less. The setting of the mass ratio within the range can further improve the dispersion stability of the pigment in the ink.

(Resin Particles)

The ink of the present invention contains resin particles. The incorporation of the resin particles can improve the rubfastness of an image to be recorded. The term "resin particles" as used in the present invention means "particles each formed of a resin that can be present in a dispersed state in an aqueous medium." Polyurethane resin particles or acrylic resin particles are preferred as the resin particles. When not the resin particles but a water-soluble resin that cannot be present in a particle state in the ink is incorporated, the rate at which the ink permeates into a recording medium increases or the viscosity of the ink increases in some cases.

The content of the resin particles in the ink is preferably 0.1 mass % or more and 15.0 mass % or less, more preferably 1.0 mass % or more and 8.0 mass % or less with reference to the total mass of the ink. When the content of the resin particles falls within the range, the fastness of an image and the ejection stability of the ink can be further improved.

The 50% cumulative volume-average particle diameter ($D_{50}$) of the resin particles is preferably 10 nm or more and 200 nm or less, more preferably 50 nm or more and 200 nm or less. In addition, the weight-average molecular weight of the resin particles may be measured with a polystyrene standard sample by gel permeation chromatography (GPC). For example, those described below may be used as a GPC apparatus and the like. In addition, a product available under the trade name "PS-1" or "PS-2" (manufactured by Polymer Laboratories) may be used as the polystyrene standard sample.

Apparatus: Alliance GPC 2695 (manufactured by Waters)
Column: Four continuous columns of Shodex KF-806M (manufactured by Showa Denko K.K.)
Detector: Refractive index (RI) detector The acid value of the resin particles is preferably 20 mgKOH/g or more and 150 mgKOH/g or less, more preferably 30 mgKOH/g or more and 120 mgKOH/g or less, particularly preferably 40 mgKOH/g or more and 90 mgKOH/g or less. The use of the resin particles whose acid value falls within the range can further suppress stripe-like image unevenness and strike-through. The acid value of the resin particles may be measured by potentiometric titration. The acid value of the resin particles may be measured, for example, as follows: a liquid obtained by dissolving the resin particles in THF is defined as a sample, and the sample is subjected to potentiometric titration by using an automatic potentiometric titration apparatus (trade name "AT-510", manufactured by Kyoto Electronics Manufacturing Co., Ltd.) and a potassium hydroxide-ethanol titrant.

[Polyurethane Resin Particles]
[Physical Properties of Polyurethane Resin Particles]

The weight-average molecular weight of the polyurethane resin particles in terms of polystyrene measured by GPC is preferably 5,000 or more and 150,000 or less, more preferably 8,000 or more and 100,000 or less. When the weight-average molecular weight of the polyurethane resin particles falls within the range, the rubfastness of an image, the storage stability of the ink, and the ejection stability of the ink can be further improved.

The acid value of the polyurethane resin particles is preferably 100 mgKOH/g or less, more preferably 5 mgKOH/g or more and 30 mgKOH/g or less. In addition, the glass transition temperature (Tg) of each of the polyurethane resin particles is preferably −80° C. or more, more preferably −50° C. or more. In addition, the glass transition temperature (Tg) of each of the polyurethane resin particles is preferably 120° C. or less, more preferably 100° C. or less.

[Method of Producing Polyurethane Resin Particles]

The polyurethane resin particles may be produced in accordance with a method that has heretofore been generally used. A polyurethane resin may be produced in accordance with, for example, the following method. First, a polyol free of any acid group and an organic solvent, such as methyl ethyl ketone, are mixed and sufficiently stirred so that the polyol may be dissolved. After that, a polyisocyanate and a diol having an acid group are added and caused to react with the solution. Thus, a urethane prepolymer solution is obtained. Next, the resultant urethane prepolymer solution is neutralized and then ion-exchanged water is added to the neutralized product, followed by emulsification through high-speed stirring with a homomixer. After the emulsification, a chain extender is added to perform a chain extension reaction. Thus, the polyurethane resin particles can be obtained. The materials constituting the polyurethane resin particles are described below.

(1) Polyisocyanate

The polyurethane resin constituting the polyurethane resin particles typically contains a unit derived from a polyisocyanate. The term "polyisocyanate" as used in the present invention means a compound having two or more isocyanate groups. Examples of the polyisocyanate may include an aliphatic polyisocyanate, an alicyclic polyisocyanate, an aromatic polyisocyanate, and an aromatic-aliphatic polyisocyanate. The content of the unit derived from the polyisocyanate in the polyurethane resin is preferably 10.0 mass % or more and 80.0 mass % or less with reference to the entirety of the resin.

Specific examples of the aliphatic polyisocyanate may include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Specific examples of the alicyclic polyisocyanate may include isophorone diisocyanate, hydrogenated xylylene diisocyanate, dicyclohexylmethane 4,4'-diisocyanate, 1,4-cyclohexane diisocyanate, methylcyclohexylene diisocyanate, and 1,3-bis(isocyanatomethyl)cyclohexane. Specific examples of the aromatic polyisocyanate may include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Specific examples of the aromatic-aliphatic polyisocyanate may include a dialkyldiphenylmethane diisocyanate, a tetraalkyl diphenylmethane diisocyanate, and $\alpha,\alpha,\alpha,\alpha$-tetramethyl-xylylene diisocyanate. One kind of those polyisocyanates may be used alone, or two or more kinds thereof may be used in combination. Of those polyisocyanates, isophorone diisocyanate, hexamethylene diisocyanate, and dicyclohexylmethane 4,4'-diisocyanate are preferred.

(2) Polyol Free of any Acid Group

The polyurethane resin constituting the polyurethane resin particles preferably contains a unit derived from a polyol free of any acid group. The content of the unit derived from the polyol free of any acid group in the polyurethane resin is preferably 0.1 mass % or more and 80.0 mass % or less with reference to the entirety of the polyurethane resin.

Examples of the polyol free of any acid group may include a polyester polyol, a polyether polyol, and a polycarbonate diol. The number of carbon atoms of the polyol free of any acid group is preferably 13 or more and 250 or less. The number-average molecular weight of the polyol free of any acid group in terms of polystyrene measured by GPC is preferably 600 or more and 4,000 or less.

The polyester polyol may be, for example, an ester of an acid component with a polyalkylene glycol, a dihydric alcohol, or a trihydric or more polyhydric alcohol. Examples of the acid component may include an aromatic dicarboxylic acid, an alicyclic dicarboxylic acid, and an aliphatic dicarboxylic acid. Examples of the aromatic dicarboxylic acid may include isophthalic acid, terephthalic acid, orthophthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid. Examples of the alicyclic dicarboxylic acid may include hydrogenated products of the aromatic dicarboxylic acids described above. Examples of the aliphatic dicarboxylic acid may include malonic acid, succinic acid, tartaric acid, oxalic acid, glutaric acid, adipic acid, pimelic acid, suberic acid, azelaic acid, sebacic acid, an alkyl succinic acid, linolenic acid, maleic acid, fumaric acid, mesaconic acid, citraconic acid, and itaconic acid. In addition, each of reactive derivatives, such as acid anhydrides, alkyl esters, or acid halides, of the acid components may also be used as the acid component constituting the polyester polyol. One kind of those acid components may be used alone, or two or more kinds thereof may be used in combination.

Examples of the polyalkylene glycol may include polyethylene glycol, polypropylene glycol, polytetramethylene glycol, and an ethylene glycol-propylene glycol copolymer. Examples of the dihydric alcohol may include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trihydric or more polyhydric alcohol may include glycerin, trimethylolpropane, 1,2,5-hexanetriol, 1,2,6-hexanetriol, and pentaerythritol. One kind of those polyester polyols may be used alone, or two or more kinds thereof may be used in combination.

Examples of the polyether polyol may include addition polymers of a polyalkylene glycol and an alkylene oxide with a dihydric alcohol or a trihydric or more polyhydric alcohol. Examples of the polyalkylene glycol may include polyethylene glycol, polypropylene glycol, polytetramethylene glycol, and an ethylene glycol-propylene glycol copolymer. Examples of the dihydric alcohol may include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trihydric or more polyhydric alcohol may include glycerin, trimethylolpropane, 1,2,5-hexanetriol, 1,2,6-hexanetriol, and pentaerythritol. Examples of the alkylene oxide may include ethylene oxide, propylene oxide, butylene oxide, and an $\alpha$-olefin oxide. One kind of those polyether polyols may be used alone, or two or more kinds thereof may be used in combination.

A polycarbonate diol produced by a conventionally known method may be used as the polycarbonate diol. For example, a polycarbonate diol obtained by causing a carbonate component, such as an alkylene carbonate, a diaryl carbonate, or a dialkyl carbonate, or phosgene and an aliphatic diol component to react with each other may be used. One kind of those polycarbonate diols may be used alone, or two or more kinds thereof may be used in combination.

Of the polyols each free of any acid group, a polyether polyol is preferably used. When the polyurethane resin particles produced by using the polyether polyol are used, a resin film to be formed has moderate flexibility and hence the rubfastness of an image can be further improved. In addition, the polyether polyol has relatively high hydrophilicity and hence the ejection stability of the ink can be improved. Of the polyether polyols, polypropylene glycol is particularly preferred.

(3) Diol Having Acid Group

The polyurethane resin constituting the polyurethane resin particles preferably contains a unit derived from a diol having an acid group. The term "diol having an acid group" as used in the present invention means a diol having an acid group, such as a carboxyl group, a sulfonate group, or a phosphate group. The diol having an acid group may be used in the form of a salt with an alkali metal, such as Li, Na, or K, or of a salt with an organic amine, such as ammonia or dimethylamine. Dimethylolpropionic acid or dimethylolbutanoic acid is preferably used as the diol having an acid group. One kind of those diols each having an acid group may be used alone, or two or more kinds thereof may be used in combination. The content of the unit derived from the diol having an acid group in the polyurethane resin is preferably 5.0 mass % or more and 40.0 mass % or less with reference to the entirety of the polyurethane resin.

(4) Chain Extender

A chain extender may be used at the time of the production of the polyurethane resin particles. The chain extender is a compound that can react with a remaining isocyanate group that has not formed any urethane bond out of the polyisocyanate units in the urethane prepolymer. Specific examples of the chain extender include trimethylolmelamine and derivatives thereof, dimethylol urea and derivatives thereof, dimethylolethylamine, diethanolmethylamine, dipropanolethylamine, dibutanolmethylamine, a polyvalent amine compound, such as ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, or hydrazine, polyamide polyamine, and polyethylene polyimine.

Specific examples of the chain extender may further include ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerin, trimethylolpropane, and pentaerythritol. One kind of those chain extenders may be used alone, or two or more kinds thereof may be used in combination.

[Acrylic Resin Particles]
[Physical Properties of Acrylic Resin Particles]

The weight-average molecular weight of the acrylic resin particles in terms of polystyrene measured by GPC is preferably 100,000 or more and 3,000,000 or less, more preferably 300,000 or more and 1,000,000 or less. When the weight-average molecular weight of the acrylic resin particles falls within the range, the rubfastness of an image, the storage stability of the ink, and the ejection stability of the ink can be further improved.

The acid value of the acrylic resin particles is preferably 150 mgKOH/g or less, more preferably 25 mgKOH/g or more and 140 mgKOH/g or less. The glass transition temperature (Tg) of each of the acrylic resin particles is preferably $-20°$ C. or more, more preferably $-10°$ C. or more, particularly preferably 25° C. or more. In addition, the glass transition temperature (Tg) of each of the acrylic resin particles is preferably 120° C. or less, more preferably 100° C. or less.

[Monomer to be Used for Acrylic Resin Particles]

An example of the monomer to be used to produce the acrylic resin constituting the acrylic resin particles is a (meth)acrylic monomer. Specific examples of the (meth)acrylic monomer may include (meth)acrylic acid alkyl esters, such as methyl (meth)acrylate, ethyl (meth)acrylate, propyl (meth)acrylate, butyl (meth)acrylate, hexyl (meth)acrylate, octyl (meth)acrylate, lauryl (meth)acrylate, and stearyl (meth)acrylate; and (meth)acrylic acids, such as acrylic acid and methacrylic acid. The acrylic resin may be a homopolymer of (meth)acrylic monomers or a copolymer of (meth)acrylic monomers with other monomers. Examples of the other monomers may include vinyl esters, olefins, styrenes, crotonic acids, itaconic acids, maleic acids, fumaric acids, acrylamides, allyl compounds, vinyl ethers, vinyl ketones, glycidyl esters, and unsaturated nitriles. When the acrylic resin is a copolymer, the content of a unit derived from a (meth)acrylic monomer in the copolymer is preferably 60 mol % or more with reference to the entirety of the copolymer. When a self-dispersion pigment is used as the pigment, resin particles each formed of a resin containing an ester bond in its molecular structure are preferably used.

(Surfactant)

The ink of the present invention contains a surfactant represented by the following general formula (1):

wherein in the general formula (1), $R_1$ to $R_4$ each independently represent an alkyl group having 1 to 3 carbon atoms, x and y each independently represent a numerical value of from 1 to 5, and m+n represents a numerical value of from 0 to 7.

In the general formula (1), $R_1$ to $R_4$ each preferably represent a methyl group. x and y preferably each independently represent a numerical value of from 1 to 2. m and n preferably each independently represent a numerical value of from 0 to 7, and m+n preferably represents a numerical value of from 2 to 5.

Specific examples of the surfactant represented by the general formula (1) may include products available under the trade names "Surfynol 104" and "Surfynol 440" (that are manufactured by Air Products and Chemicals, Inc.), "Acetylenol E40" and "Acetylenol E60" (that are manufactured by Kawaken Fine Chemicals Co., Ltd.), and "Dynol 604", "Dynol 607", "Dynol 800", and "Dynol 810" (that are manufactured by Air Products and Chemicals, Inc.).

The content of the surfactant represented by the general formula (1) in the ink is 0.7 mass % or more, preferably 3.0 mass % or less, more preferably 0.7 mass % or more and 1.5 mass % or less with reference to the total mass of the ink. When the content of the surfactant represented by the general formula (1) is less than 0.7 mass %, a dot diameter is not sufficiently expanded. Meanwhile, when the content of the surfactant represented by the general formula (1) is 3.0 mass % or less, a suppressing effect on strike-through is further improved.

The mass ratio of the content of the surfactant represented by the general formula (1) to the total of the content (mass %) of the pigment and the content (mass %) of the resin particles needs to be 0.25 or less. In addition, the mass ratio is preferably 0.03 or more and 0.2 or less, more preferably 0.05 or more and 0.17 or less. When the mass ratio is set to 0.25 or less, an image suppressed in strike-through can be recorded. When the mass ratio is more than 0.25, the content of the surfactant represented by the general formula (1) becomes excessive with respect to the total of the content of the pigment and the content of the resin particles, and hence it becomes difficult to suppress the occurrence of the strike-through.

(Water)

The ink of the present invention is an aqueous ink containing water. Deionized water (ion-exchanged water) is preferably used as the water. The content of the water in the ink is preferably 50 mass % or more and 90 mass % or less with reference to the total mass of the ink.

(Water-Soluble Organic Compound)

The ink of the present invention contains a water-soluble organic compound. The term "water-soluble organic compound" as used in the present invention means an "organic compound having a solubility in water at 20° C. of 500 g/L or more." Any one of the known compounds that may be used in inks, such as water-soluble organic solvents, may be used as the water-soluble organic compound. Specific examples of the water-soluble organic compound may include alcohols, glycols, alkylene glycols, polyethylene glycols, nitrogen-containing compounds, and sulfur-containing compounds. From the viewpoint of the adjustment of the viscosity of the ink, glycerin, ethylene glycol, diethylene glycol, triethylene glycol, a polyethylene glycol having a weight-average molecular weight of 10,000 or less, 1,3-propanediol, or diglycerol is preferably used. The polyethylene glycol and glycerin are each more preferably used. The number-average molecular weight of the polyethylene glycol is preferably 400 or more and 2,000 or less. One kind of those water-soluble organic compounds can be used alone, or two or more kinds thereof can be used in combination. The content of the water-soluble organic compound in the ink is 35 mass % or less, preferably 10 mass % or more and 30 mass % or less with reference to the total mass of the ink.

The content of the "first water-soluble organic compound" that is liquid at 25° C. and has a surface tension at 25° C. of 40 mN/m or less out of the water-soluble organic compound is 5 mass % or less with reference to the total mass of the ink. The content of the first water-soluble organic compound in the ink is preferably 3 mass % or less, more preferably 0 mass % (i.e., the ink is substantially free of the compound) with reference to the total mass of the ink. Specific examples of the first water-soluble organic compound may include propylene glycol, 1,3-butanediol, 1,5-pentanediol, 1,2-hexanediol, and glycol ethers.

[Method of Judging Whether or not Surface Tension of Water-Soluble Organic Compound is 40 mN/m or Less]

First, a liquid prepared by concentrating or diluting the ink so that the content of its total solid content may be about 10 mass % is provided. Next, the liquid is centrifuged at 12,000 rpm for 1 hour to provide a liquid layer containing components, such as a water-soluble organic compound, e.g., a water-soluble organic solvent, and a resin that does not contribute to dispersion. The kind of the water-soluble organic compound may be identified by analyzing the resultant liquid layer through the use of a high-performance liquid chromatograph-mass spectrometer (LC-MS) and nuclear magnetic resonance (NMR). When the water-soluble organic compound whose kind has been identified is obtained or synthesized, and its surface tension is measured under the condition of 25° C. in accordance with an ordinary method, whether or not the surface tension of the water-soluble organic compound is 40 mN/m or less may be judged.

(Additives)

The ink of the present invention may contain various additives, such as a surfactant except the surfactant represented by the general formula (1), a pH adjustor, a surface lubricant, a corrosion inhibitor, a preservative agent, a fungicide, an antioxidant, an antireducing agent, an evaporation promoter, and a chelator, as required.

An amine compound having a buffer capacity is preferably used as the pH adjustor. The amine compound having a buffer capacity may be, for example, N-butyldiethanolamine. In addition, a fluorine-based surfactant, a polyethylene wax, or the like may be used as the surface lubricant.

(Surface Tension)

The surface tension of the ink of the present invention at 25° C. is 25 mN/m or more and 35 mN/m or less, preferably 26 mN/m or more and 34 mN/m or less, more preferably 27 mN/m or more and 33 mN/m or less. When the surface tension of the ink is more than 35 mN/m, a dot diameter is not sufficiently expanded. Meanwhile, when the surface tension of the ink is less than 25 mN/m, strike-through is liable to occur. The surface tension of the ink may be measured with, for example, a plate type surface tensiometer (trade name "CBVP-A3", manufactured by Kyowa Interface Science Co., Ltd.) at 25° C. The term "surface tension" as used in the present invention means a "static surface tension".

<Ink Cartridge>

An ink cartridge of the present invention includes an ink storage portion configured to store an ink. In addition, the ink of the present invention described above is stored in the ink storage portion. The ink storage portion may be, for example, an ink storage portion having: an ink storage chamber configured to store a liquid ink; and a negative pressure-generating member storage chamber configured to store a negative pressure-generating member configured to hold the ink in itself with a negative pressure. In addition, the ink cartridge may be an ink cartridge that does not include an ink storage chamber configured to store a liquid ink but includes an ink storage portion configured to hold the total amount of the ink with the negative pressure-generating member. Further, the ink cartridge may be an ink cartridge of a mode including the ink storage portion and a recording head.

<Image Recording Method>

An image recording method of the present invention includes an ink-applying step of applying the ink of the present invention described above to a recording medium. In addition, the image recording method of the present invention preferably further includes a conveying step of conveying the recording medium and a heating step of heating the recording medium having applied thereto the ink.

Figure 1:
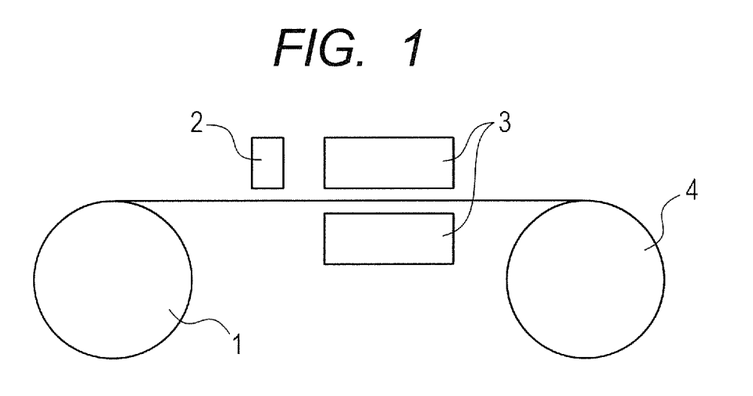
FIG. 1 is a schematic view for illustrating an example of an image recording apparatus to be used in an image recording method of the present invention.

FIG. 1 is a schematic view for illustrating an example of an image recording apparatus to be used in the image recording method of the present invention. In the image recording apparatus illustrated in FIG. 1, the following mode has been illustrated: a recording medium wound in a roll shape is used and the recording medium having recorded thereon an image is wound in a roll shape again. That is, the image recording apparatus illustrated in FIG. 1 includes a recording medium-supplying unit 1, an ink-applying unit 2, a heating unit 3, and a recording medium-recovering unit 4. The recording medium-supplying unit 1 is a unit for holding and supplying the recording medium wound in a roll shape. The ink-applying unit 2 is a unit for applying the ink to the recording medium fed from the recording medium-supplying unit 1. The heating unit 3 is a unit for heating the recording medium having applied thereto the ink. In addition, the recording medium-recovering unit 4 is a unit for winding the recording medium having applied thereto the ink and having recorded thereon an image. The recording medium is conveyed by a conveying unit including a conveying member, such as a roller pair or a belt, along a conveying path illustrated by the solid line in FIG. 1, and is treated in each unit. For example, the following treatment may be performed: the recording medium wound in a roll shape by the recording medium-recovering unit 4 is supplied to another apparatus or the like, and the recording medium is cut into a desired size or bound into a book.

The speed at which the recording medium is conveyed in the conveying step is preferably 50 m/min or more, more preferably 100 m/min or more. In addition, from the viewpoint of a drying property or the like, the ejection amount of the ink per color is preferably 1.0 mg/cm² or less, more preferably 0.8 mg/cm² or less.

A moderate tension is preferably applied to the recording medium at the time of its conveyance. That is, the image recording apparatus preferably further includes a tension-applying unit for applying a tension to the recording medium. Specifically, it is sufficient that a tension-applying portion configured to apply a tension to the recording medium, a tension-adjusting portion configured to adjust the tension to be applied to the recording medium, and the like be arranged in the conveying path between the recording medium-supplying unit 1 and the recording medium-recovering unit 4. The application of the tension to the recording medium suppresses the swelling of fibers constituting the recording medium due to the water in the ink. The swelling of the fibers constituting the recording medium increases the volume of a gap between the fibers to increase the permeation rate of the ink. However, when the permeation rate of the ink increases, the ink is liable to deeply permeate in a direction perpendicular to the surface of the recording medium, and hence the optical density of the image becomes insufficient in some cases. In contrast, the application of the tension to the recording medium suppresses the swelling of the fibers constituting the recording medium, and hence can suppress a reduction in optical density of the image due to an increase in permeation rate of the ink.

The tension to be applied to the recording medium is set to preferably 20 N/m or more, more preferably 30 N/m or more, particularly preferably 40 N/m or more and 100 N/m or less. The setting of the tension to be applied to the recording medium to 20 N/m or more can more efficiently suppress the swelling of the fibers constituting the recording medium due to the water in the ink.

(Ink-Applying Step)

The ink-applying step is the step of applying the ink to the recording medium. An inkjet system is preferably adopted as a system for the application of the ink to the recording medium. That is, the image recording method of the present invention is preferably an inkjet recording method. The inkjet system may be a thermal inkjet system, or may be a piezo inkjet system. The thermal inkjet system is a system involving applying thermal energy to the ink to eject the ink from an ejection orifice of a recording head. In addition, the piezo inkjet system is a system involving ejecting the ink from the ejection orifice of the recording head with a piezoelectric element. In the image recording method of the present invention, an ink containing resin particles and having a relatively high solid content concentration is used, and hence the ink is preferably applied to the recording medium by the piezo inkjet system from the viewpoint of the ejection stability of the ink.

The recording head may be a serial type recording head, or may be a full-line type recording head. The serial type recording head is a recording head configured to scan a recording medium in a direction intersecting its conveying direction to record an image. In addition, the full-line type recording head is a recording head having a plurality of nozzles arrayed in a range covering the maximum width of the recording medium. The full-line type inkjet recording head is preferably used because an image can be recorded at higher speed. The full-line type inkjet recording head is preferably a recording head having a nozzle train arrayed in a direction perpendicular to the conveying direction of the recording medium. In addition, it is typically preferred that a plurality of full-line type inkjet recording heads be arranged for each ink color, and the respective recording heads be sequentially arrayed along the conveying direction of the recording medium so as to be parallel to each other.

(Heating Step)

The heating step is the step of performing heating so that the surface temperature of the recording medium having applied thereto the ink may be 70° C. or more. The expression "surface temperature of the recording medium having applied thereto the ink" as used in the present invention means the surface temperature of the recording medium at a position defined as follows: when the time point at which the ink is applied to the recording medium is defined as 0 seconds, a temperature at a position distant from the application position by a distance corresponding to 0.5 second of its conveyance is measured. For example, it is hypothesized that the speed at which the recording medium is conveyed is "V" m/min. When such hypothesis is formed, it is sufficient to measure the surface temperature of an ink application region X in the recording medium at a position distant from the position at which the ink has been applied along its conveying direction by the movement distance of the application region X, i.e., "(V×0.5)/60" m. The term "position at which the ink has been applied" in the case of the full-line type inkjet recording head means a position directly below the recording head. In each of Examples to be described later, the surface temperature of a recording medium was measured with a noncontact infrared thermometer digital radiation temperature sensor (trade name "FT-H20", manufactured by Keyence Corporation) from a position distant from the surface of the recording medium in a generally vertical direction by 10 cm.

In the heating step, the heating is preferably performed so that the surface temperature of the recording medium having applied thereto the ink may be 80° C. or more. In addition, from the viewpoint of the prevention of the deformation of the recording medium due to heat, the heating is preferably performed so that the surface temperature may be 140° C. or less. Examples of a method of heating the recording medium may include: a method involving arranging a heater to heat the recording medium from its front surface side (side on which the ink is to be applied); a method involving heating the recording medium from its rear surface side; and a method involving heating both surfaces of the recording medium.

The recording medium may be continuously heated during a time period from a time point before the application of the ink to that after the application. Before the application of the ink, it is preferred that the recording medium be not heated or be heated so as to have a surface temperature of less than 70° C., it is more preferred that the recording medium be heated so as to have a surface temperature of 60° C. or less, and it is particularly preferred that the recording medium be heated so as to have a surface temperature of 40° C. or less.

When the recording medium is heated, the recording medium may be pressurized with, for example, a pressure roller. The pressurization of the recording medium can improve the fixability of an image. When the recording medium is pressurized, there is no need to perform the pressurization over the entire process of the heating step, and the pressurization may be performed only in part of the process of the heating step. In addition, the recording medium may be pressurized in many stages, or the image recording method may further include a pressurizing step after the heating step.

(Recording Medium)

Figure 2:
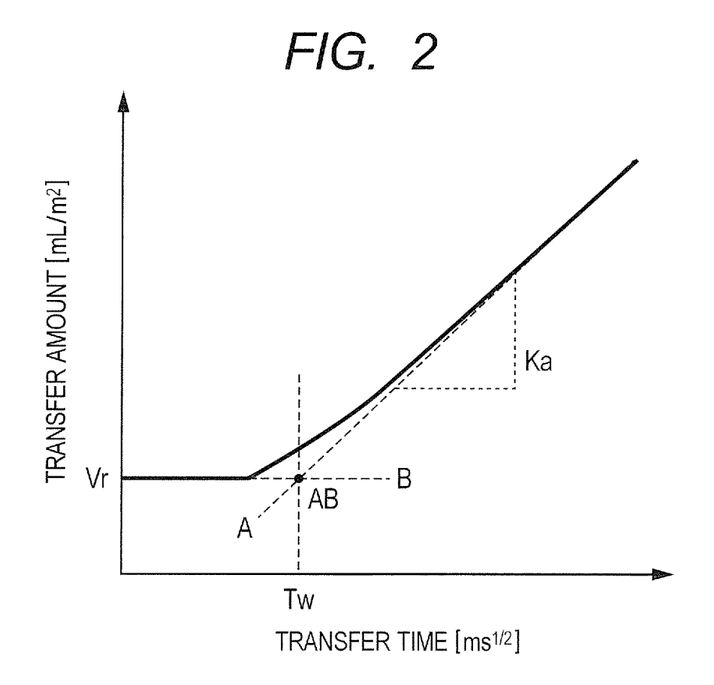
FIG. 2 is a graph for showing an example of an absorption curve describing an absorption coefficient Ka of a recording medium for water.

Any one of the recording media that have heretofore been generally used may be used as the recording medium. Of those, a recording medium having an absorption coefficient Ka for water of 0.1 mL/(m$^2$·ms$^{1/2}$) or more and 3.0 mL/(m$^2$·ms$^{1/2}$) or less is preferred, a recording medium having an absorption coefficient Ka for water of 0.2 mL/(m$^2$·ms$^{1/2}$) or more is more preferred, and a recording medium having an absorption coefficient Ka for water of 0.3 mL/(m$^2$·ms$^{1/2}$) or more is particularly preferred. The Bristow method described in the "Method of testing Paper and Paperboard for their Liquid-absorbing Properties" of JAPAN TAPPI Paper Pulp Test Method No. 51 is used as a method of deriving the absorption coefficient Ka of the recording medium for water. Although detailed description about the Bristow method is omitted because many commercial books each describe the method, the absorption coefficient Ka (mL/(m$^2$·ms$^{1/2}$)) is defined by a wetting time Tw and a roughness index Vr (mL/m$^2$). FIG. 2 is a graph for showing an example of an absorption curve describing the absorption coefficient Ka of the recording medium for water. The absorption curve shown in FIG. 2 is based on the following permeation model: the permeation of a liquid into a recording medium starts after a lapse of the wetting time Tw from the contact of the liquid with the recording medium. The gradient of a straight line after a lapse of the wetting time Tw is the absorption coefficient Ka. The absorption coefficient Ka corresponds to the rate at which the liquid permeates into the recording medium. As shown in FIG. 2, the wetting time Tw is calculated as follows: a point of intersection AB of an approximate straight line A based on a least-squares method for calculating the absorption coefficient Ka, and a straight line B corresponding to "V=Vr" represented by a transfer amount V of the liquid and the roughness index Vr is determined, and a time from the origin to the point of intersection AB is defined as the wetting time. The temperature of the liquid (water) to be caused to permeate into the recording medium is set to 25° C. That is, the absorption coefficient Ka for water in the present invention is the absorption coefficient Ka for water at 25° C.

A recording medium having a mineral, such as kaolin or talc, or a filler, such as calcium carbonate, titanium dioxide, or silica, applied to its surface for the purpose of increasing its whiteness or opacity is preferably used as the recording medium. Of those, calcium carbonate is preferred because calcium carbonate has a whiteness higher than those of kaolin and talc, and is less expensive than titanium dioxide, silica, and the like. The content of calcium in the recording medium to be used in the image recording method of the present invention is preferably 1 mass % or more and 5 mass % or less with reference to the total of all elements except hydrogen.

The recording medium may be a recording medium cut into a desired size in advance, or may be an elongated recording medium wound in a roll shape, the recording medium being cut into a desired size after image recording. Of those, the elongated recording medium wound in a roll shape is preferably used because a tension can be easily applied thereto.

According to one embodiment of the present invention, there can be provided an ink having the following features: even when the ejection amount of the ink is not increased, a dot diameter can be expanded; and the ink can record an image having satisfactory concealment and suppressed in strike-through. According to another embodiment of the present invention, there can be provided an ink cartridge and an image recording method each using the ink.

EXAMPLES

The present invention is more specifically described below by way of Examples and Comparative Examples. The present invention is by no means limited to Examples below without departing from the gist of the present invention. "Part(s)" and "%" with regard to the description of the amounts of components are by mass, unless otherwise stated.

<Preparation of Pigment Dispersion Liquid A>

A 500-milliliter recovery flask with a mechanical stirring apparatus was loaded into the tank of an ultrasonic generator. 2.0 Grams of a resin dispersant (styrene-acrylic acid random copolymer, acid value: 80 mgKOH/g) and 120 mL of tetrahydrofuran were loaded into the recovery flask, and the contents were stirred while an ultrasonic wave was applied thereto. In addition, 5 g of a pigment (carbon black (trade name "FW18PS", manufactured by Cabot)) and 120 mL of tetrahydrofuran were loaded into another container. The contents were mixed with a planetary stirring machine (manufactured by Kurabo Industries Ltd.) until the surfaces of pigment particles were sufficiently wet with the solvent. After that, the contents were added to the recovery flask, followed by mixing. An aqueous solution of potassium hydroxide was dropped and injected into the mixture to perform phase inversion until the neutralization index of the resin dispersant became 100%, and then premixing was performed for 60 minutes. After that, the resultant was dispersed with an atomization apparatus (trade name "NANOMIZER NM2-L200AR", manufactured by Yoshida Kikai Co., Ltd.) for 2 hours to provide a dispersion liquid. Tetrahydrofuran was removed from the resultant dispersion liquid by distillation with a rotary evaporator, and the concentration of the residue was adjusted. Thus, a pigment dispersion liquid A in which the content of the pigment was 6.0%, and the mass ratio of the content (%) of the pigment to the content (%) of the resin dispersant was 2.5 was obtained.

<Preparation of Ink>

Respective components were mixed so as to have amounts (%) shown in Table 1. Water was added so that the total amount became 100%. The mixture was sufficiently stirred to be dispersed, and was then filtered with a glass filter (trade name "AP20", manufactured by Merck Millipore Corporation) to prepare each ink. The "content (%) of a pigment" and the "content (%) of a resin" in Table 1 mean the "content (%) of the solid content of the pigment" and the "content (%) of the solid content of the resin" in an ink, respectively. Abbreviations in Table 1 are as described below.

Of the following "resins", "W5661", "HUX-401", "SF300", "J711", and "BT9" each formed resin particles in a prepared ink. Meanwhile, "St/AA" did not form resin particles in a prepared ink, but dissolved therein. In addition, "AE40", "AE60", "D604", "D800", and "S440" out of the following "surfactants" are each a surfactant that satisfies the requirement of a structural formula represented by the general formula (1). Meanwhile, "AE100", "E103", "S465", and "E1010" are each a surfactant that does not satisfy the requirement of the structural formula represented by the general formula (1). Further, each of compounds except "PEG1K" out of the following "water-soluble organic compounds" is liquid at 25° C.

[Pigment]

"COJ400": trade name "CAB-O-JET 400" (manufactured by Cabot)

"COJ450C": trade name "CAB-O-JET 450C" (manufactured by Cabot)

"COJ465M": trade name "CAB-O-JET 465M" (manufactured by Cabot)

"COJ470Y": trade name "CAB-O-JET 470Y" (manufactured by Cabot)

"COJ300": trade name "CAB-O-JET 300" (manufactured by Cabot)

[Resin]

"W5661": trade name "Takelac W-5661" (urethane resin emulsion, manufactured by Mitsui Chemicals, Inc., acid value: 57 mgKOH/g)

"HUX-401": trade name "ADEKA BONTIGHTER HUX-401" (urethane resin emulsion, manufactured by ADEKA Corporation, acid value: 30 mgKOH/g)

"SF300": trade name "SUPERFLEX 300" (urethane resin emulsion, manufactured by DKS Co., Ltd., acid value: 19 mgKOH/g)

"J711": trade name "Joncryl 711" (acrylic resin emulsion, manufactured by BASF, acid value: 100 mgKOH/g)

"BT9": trade name "NeoCryl BT-9" (acrylic resin emulsion, manufactured by DSM, acid value: 72 mgKOH/g)

"St/AA": styrene-acrylic acid copolymer (acid value: 170 mgKOH/g)

[Surfactant]

"AE40": trade name "ACETYLENOL E40" (manufactured by Kawaken Fine Chemicals Co., Ltd., $R_1$ to $R_4$=methyl group, x=1, y=1, m+n=4)

"AE60": trade name "ACETYLENOL E60" (manufactured by Kawaken Fine Chemicals Co., Ltd., $R_1$ to $R_4$=methyl group, x=1, y=1, m+n=6)

"AE100": trade name "ACETYLENOL E100" (manufactured by Kawaken Fine Chemicals Co., Ltd., $R_1$ to $R_4$=methyl group, x=1, y=1, m+n=10)

"E103": trade name "EMULGEN 103" (manufactured by Kao Corporation)

"D604": trade name "Dynol 604" (manufactured by Air Products and Chemicals, Inc., $R_1$ to $R_4$=methyl group, x=2, y=2, m+n=4)

"D800": trade name "Dynol 800" (manufactured by Air Products and Chemicals, Inc., $R_1$ to $R_4$=methyl group, x=2, y=2, m+n=4)

"S440": trade name "Surfynol 440" (manufactured by Air Products and Chemicals, Inc., $R_1$ to $R_4$=methyl group, x=1, y=1, m+n=3.5)

"S465": trade name "Surfynol 465" (manufactured by Air Products and Chemicals, Inc., $R_1$ to $R_4$=methyl group, x=1, y=1, m+n=10)

"E1010": trade name "OLFINE E1010" (manufactured by Nissin Chemical Industry, $R_1$ to $R_4$=methyl group, x=1, y=1, m+n=10)

[Water-Soluble Organic Compound]

"Gly": glycerin (surface tension: 63 mN/m)

"2-Py": 2-pyrrolidone (surface tension: 47 mN/m)

"PEG1K": polyethylene glycol (number-average molecular weight: 1,000, solid at 25° C.)

[First Water-Soluble Organic Compound]

"DEGmME": diethylene glycol monomethyl ether (surface tension: 35 mN/m)

TABLE 1

|  |  | Pigment |  | Surfactant |  | Resin |
|---|---|---|---|---|---|---|
|  | Ink | Kind | Content (%) | Kind | Content (%) | Kind |
| Example 1 | Black ink 1 | COJ400 | 5 | AE40 | 1 | W5661 |
| Example 2 | Black ink 2 | COJ400 | 5 | AE40 | 1 | W5661 |
| Example 3 | Black ink 3 | COJ400 | 5 | AE40 | 1 | W5661 |
| Example 4 | Black ink 4 | COJ400 | 5 | AE40 | 1 | W5661 |
| Example 5 | Black ink 5 | COJ400 | 5 | AE40 | 1 | HUX401 |
| Example 6 | Black ink 6 | COJ400 | 5 | AE40 | 1 | HUX401 |
| Example 7 | Black ink 7 | COJ400 | 5 | AE40 | 1 | HUX401 |
| Example 8 | Black ink 8 | COJ400 | 5 | AE40 | 1 | HUX401 |
| Example 9 | Black ink 9 | COJ400 | 5 | AE40 | 1 | J711 |
| Example 10 | Black ink 10 | COJ400 | 5 | AE40 | 1 | J711 |
| Example 11 | Black ink 11 | COJ400 | 5 | AE40 | 1 | J711 |
| Example 12 | Black ink 12 | COJ400 | 5 | AE40 | 1 | J711 |
| Example 13 | Black ink 13 | COJ400 | 5 | AE40 | 1 | BT9 |
| Example 14 | Black ink 14 | COJ400 | 5 | AE40 | 1 | BT9 |
| Example 15 | Black ink 15 | COJ400 | 5 | AE40 | 1 | BT9 |
| Example 16 | Black ink 16 | COJ400 | 5 | AE40 | 1 | BT9 |
| Example 17 | Black ink 17 | COJ400 | 5 | AE40 | 1 | SF300 |
| Example 18 | Black ink 18 | COJ400 | 5 | D604 | 1 | W5661 |
| Example 19 | Black ink 19 | COJ400 | 5 | D800 | 1 | W5661 |
| Example 20 | Black ink 20 | COJ400 | 5 | S440 | 1 | W5661 |
| Example 21 | Black ink 21 | COJ400 | 5 | AE60 | 1 | W5661 |
| Example 22 | Cyan ink 1 | COJ450C | 5 | AE40 | 1 | W5661 |
| Example 23 | Magenta ink 1 | COJ465M | 5 | AE40 | 1 | W5661 |

TABLE 1-continued

| | | | | | | |
|---|---|---|---|---|---|---|
| Example 24 | Yellow ink 1 | COJ470Y | 5 | AE40 | 1 | W5661 |
| Example 25 | Black ink 22 | COJ300 | 5 | AE40 | 1 | W5661 |
| Example 26 | Black ink 23 | Pigment dispersion liquid A | 5 | AE40 | 1 | W5661 |
| Comparative Example 1 | Black ink 25 | COJ400 | 5 | E103 | 1 | W5661 |
| Comparative Example 2 | Black ink 26 | COJ400 | 5 | AE100 | 1 | W5661 |
| Comparative Example 3 | Black ink 27 | COJ400 | 5 | AE40 | 0.6 | W5661 |
| Comparative Example 4 | Black ink 28 | COJ400 | 5 | AE40 | 3 | W5661 |
| Comparative Example 5 | Black ink 29 | COJ400 | 5 | AE40 | 1 | St/AA |
| Comparative Example 6 | Black ink 30 | COJ400 | 5 | AE40 | 1 | None |
| Comparative Example 7 | Black ink 31 | COJ400 | 5 | AE40 | 1 | W5661 |
| Comparative Example 8 | Black ink 32 | COJ400 | 5 | AE40 | 1 | W5661 |
| Comparative Example 9 | Black ink 33 | COJ400 | 5 | S465 | 1 | W5661 |
| Comparative Example 10 | Black ink 34 | COJ400 | 5 | E1010 | 1 | W5661 |

| | Resin | Water-soluble organic compound | | | | Surface tension |
|---|---|---|---|---|---|---|
| | Content (%) | Gly (%) | 2-Py (%) | PEG1K (%) | DEGmME (%) | (mN/m) |
| Example 1 | 5 | 20 | 0 | 0 | 0 | 33 |
| Example 2 | 5 | 20 | 3 | 0 | 0 | 33 |
| Example 3 | 5 | 20 | 0 | 3 | 0 | 33 |
| Example 4 | 5 | 20 | 0 | 0 | 3 | 33 |
| Example 5 | 5 | 20 | 0 | 0 | 0 | 25 |
| Example 6 | 5 | 20 | 3 | 0 | 0 | 25 |
| Example 7 | 5 | 20 | 0 | 3 | 0 | 25 |
| Example 8 | 5 | 20 | 0 | 0 | 3 | 25 |
| Example 9 | 5 | 20 | 0 | 0 | 0 | 30 |
| Example 10 | 5 | 20 | 3 | 0 | 0 | 30 |
| Example 11 | 5 | 20 | 0 | 3 | 0 | 30 |
| Example 12 | 5 | 20 | 0 | 0 | 3 | 30 |
| Example 13 | 5 | 20 | 0 | 0 | 0 | 30 |
| Example 14 | 5 | 20 | 3 | 0 | 0 | 30 |
| Example 15 | 5 | 20 | 0 | 3 | 0 | 30 |
| Example 16 | 5 | 20 | 0 | 0 | 3 | 30 |
| Example 17 | 5 | 20 | 0 | 0 | 0 | 26 |
| Example 18 | 5 | 20 | 0 | 0 | 0 | 31 |
| Example 19 | 5 | 20 | 0 | 0 | 0 | 31 |
| Example 20 | 5 | 20 | 0 | 0 | 0 | 32 |
| Example 21 | 5 | 20 | 0 | 0 | 0 | 33 |
| Example 22 | 5 | 20 | 0 | 0 | 0 | 33 |
| Example 23 | 5 | 20 | 0 | 0 | 0 | 33 |
| Example 24 | 5 | 20 | 0 | 0 | 0 | 33 |
| Example 25 | 5 | 20 | 0 | 0 | 0 | 33 |
| Example 26 | 5 | 20 | 0 | 0 | 0 | 33 |
| Comparative Example 1 | 5 | 20 | 0 | 0 | 0 | 33 |
| Comparative Example 2 | 5 | 20 | 0 | 0 | 0 | 35 |
| Comparative Example 3 | 5 | 20 | 0 | 0 | 0 | 34 |
| Comparative Example 4 | 5 | 20 | 0 | 0 | 0 | 30 |
| Comparative Example 5 | 5 | 20 | 0 | 0 | 0 | 33 |
| Comparative Example 6 | 0 | 20 | 0 | 0 | 0 | 32 |
| Comparative Example 7 | 5 | 40 | 0 | 0 | 0 | 33 |
| Comparative Example 8 | 5 | 20 | 0 | 0 | 7 | 33 |
| Comparative Example 9 | 5 | 20 | 0 | 0 | 0 | 35 |
| Comparative Example 10 | 5 | 20 | 0 | 0 | 0 | 35 |

<Evaluation>

(Strike-Through of Image)

Each of the prepared inks (the black inks 1 to 34, the cyan ink 1, the magenta ink 1, and the yellow ink 1) was applied onto a recording medium (trade name "OK Prince High Quality", manufactured by Oji Paper Co., Ltd., basis weight: 64 g/m$^2$) with a bar coater to record an image. The optical density of the image on the rear surface side of the recording medium was measured with a reflection densitometer (trade name "RD-19I", manufactured by GretagMacbeth), and the strike-through of the image was evaluated in accordance with the following evaluation criteria. The results of the evaluation are shown in Table 2. In the following evaluation criteria, the levels "A" and "B" were defined as preferred levels, and the level "C" was defined as an unacceptable level.

[Black Ink, Cyan Ink]

A: The optical density was less than 0.35.

B: The optical density was 0.35 or more and less than 0.38.

C: The optical density was 0.38 or more.

[Magenta Ink, Yellow Ink]

A: The optical density was less than 0.30.

B: The optical density was 0.30 or more and less than 0.34.

C: The optical density was 0.34 or more.

(Dot Diameter)

An image was recorded on a recording medium with an inkjet recording apparatus having a construction illustrated in FIG. 1, the apparatus being mounted with a piezo type inkjet head (trade name "KJ4", manufactured by Kyocera Corporation, nozzle density: 600 dpi) under the conditions shown below. A product available under the trade name "OK Prince High Quality" (manufactured by Oji Paper Co., Ltd., basis weight: 64 g/m$^2$) was used as the recording medium. The recording was performed under the conditions of: a temperature of 25° C.; a relative humidity of 55%; an ink ejection frequency of 39 kHz; a conveying speed of the recording medium of 100 m/min; and an ink ejection volume at the time of the recording of about 13 pL per dot. In the inkjet recording apparatus, the condition under which one dot of an ink droplet having a mass of 13 ng is applied to a unit region measuring 1/600 inch by 1/600 inch at a resolution of 600 dpi×600 dpi is defined as a recording duty of 100%. The recorded image was a solid image having a size measuring 3 cm by 3 cm (recording duty: 5%). In addition, the recording medium having applied thereto the ink was heated by a heating unit so that the surface temperature of the recording medium became 70° C. The dot diameter of the recorded image was measured with the dot diameter-measuring function of an image analysis system (trade name "PERSONAL IAS", manufactured by QEA), and the dot diameter was evaluated in accordance with the following evaluation criteria. A dot serving as an object of the dot diameter measurement was identified with reference to an image density measured in a relative mode. Specifically, in each of the cyan ink and the black inks, a region having an image density of 55% or more was recognized as a dot. In addition, in each of the magenta ink and the yellow ink, a region having an image density of 60% or more was recognized as a dot. The results of the evaluation are shown in Table 2. In the following evaluation criteria, the levels "A" and "B" were defined as preferred levels, and the level "C" was defined as an unacceptable level.

A: The dot diameter was 56 μm or more.

B: The dot diameter was 53 μm or more and less than 56 μm.

C: The dot diameter was less than 53 μm.

TABLE 2

|  |  | Evaluation result | |
| --- | --- | --- | --- |
| | Ink | Strike-through | Dot diameter |
| Example 1 | Black ink 1 | A | A |
| Example 2 | Black ink 2 | A | A |
| Example 3 | Black ink 3 | A | A |
| Example 4 | Black ink 4 | A | A |
| Example 5 | Black ink 5 | A | A |
| Example 6 | Black ink 6 | A | A |
| Example 7 | Black ink 7 | A | A |
| Example 8 | Black ink 8 | A | A |
| Example 9 | Black ink 9 | A | A |
| Example 10 | Black ink 10 | A | A |
| Example 11 | Black ink 11 | A | A |
| Example 12 | Black ink 12 | A | A |
| Example 13 | Black ink 13 | A | A |
| Example 14 | Black ink 14 | A | A |
| Example 15 | Black ink 15 | A | A |
| Example 16 | Black ink 16 | A | A |
| Example 17 | Black ink 17 | A | B |
| Example 18 | Black ink 18 | A | A |
| Example 19 | Black ink 19 | A | A |
| Example 20 | Black ink 20 | A | A |
| Example 21 | Black ink 21 | B | A |
| Example 22 | Cyan ink 1 | A | A |
| Example 23 | Magenta ink 1 | A | A |
| Example 24 | Yellow ink 1 | A | A |
| Example 25 | Black ink 22 | A | A |
| Example 26 | Black ink 23 | A | A |
| Comparative Example 1 | Black ink 25 | A | C |
| Comparative Example 2 | Black ink 26 | C | A |
| Comparative Example 3 | Black ink 27 | A | C |
| Comparative Example 4 | Black ink 28 | C | A |
| Comparative Example 5 | Black ink 29 | C | A |
| Comparative Example 6 | Black ink 30 | — | — |
| Comparative Example 7 | Black ink 31 | A | C |
| Comparative Example 8 | Black ink 32 | C | A |
| Comparative Example 9 | Black ink 33 | C | A |
| Comparative Example 10 | Black ink 34 | C | A |

The ink of Comparative Example 6 was not evaluated for any one of the items "strike-through" and "dot diameter" because the surfactant did not completely dissolve.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-010900, filed Jan. 22, 2016, which is hereby incorporated by reference herein in its entirety.

What is claimed is:

1. An ink comprising:

(a) a pigment;

(b) resin particles;

(c) a surfactant;

(d) at least one water-soluble organic compound; and (e) water, wherein a total of the content of the at least one water-soluble organic compound is 35 mass % or less based on a total mass of the ink, wherein the at least one water-soluble organic compound comprises at least a first water-soluble organic compound being liquid at 25° C. and having a surface tension at 25° C. of 40 mN/m or less, and the content of the first water-soluble organic compound is 5 mass % or less based on a total mass of the ink, wherein the surfactant is a surfactant represented by the following general formula (1):

wherein $R_1$ to $R_4$ each independently represents an alkyl group having 1 to 3 carbon atoms, x and y each independently represent a numerical value of from 1 to 5, and m+n represents a numerical value of from 0 to 7, wherein the content of the surfactant is 0.7 mass % or more based on a total mass of the ink, wherein a mass ratio of the content (mass %) of the surfactant to a total of the content (mass %) of the pigment and the content (mass %) of the resin particles is from 0.03 to 0.25, wherein the surface tension of the ink at 25° C. is from 25 mN/m to 35 mN/m, and wherein the resin particles have an acid value of from 20 mg KOH/g to 150 mg KOH/g.

2. The ink according to claim 1, wherein, in the general formula (1), m+n represents a numerical value of from 2 to 5.

3. The ink according to claim 1, wherein the pigment is a self-dispersion pigment.

4. The ink according to claim 3, wherein the self-dispersion pigment is a phosphonic acid-based self-dispersion pigment in which a phosphonic acid group is bonded directly or via another atomic group to a surface of particles of the pigment.

5. The ink according to claim 1, wherein the pigment is a resin-dispersed pigment dispersed with a resin dispersant.

6. The ink according to claim 5, wherein a mass ratio of the content (mass %) of the pigment to the content (mass %) of the resin dispersant is from 1.0 to 10.0.

7. An ink cartridge comprising:
an ink; and
an ink storage portion storing the ink,
wherein the ink is the ink according to claim 1.

8. An image recording method comprising an ink-applying step of applying an ink to a recording medium,
wherein the ink is the ink according to claim 1.

9. The image recording method according to claim 8, further comprising a step of heating the recording medium provided with the ink, such that a surface temperature of the recording medium is 70° C. or higher.

10. The ink according to claim 1, wherein the total of the content of the at least one water-soluble organic compound is 10 mass % or more to 30 mass % or less based on the total mass of the ink.

11. The ink according to claim 1, wherein the total of the content of the at least one water-soluble organic compound is 10 mass % or more to 20 mass % or less based on the total mass of the ink.

12. The ink according to claim 1, wherein the content of the first water-soluble organic compound is 0 mass % based on the total mass of the ink.

13. The ink according to claim 1, wherein the content of the surfactant is 0.7 mass % or more to 3.0 mass % or less based on the total mass of the ink.

14. The ink according to claim 1, wherein the mass ratio of the content (mass %) of the surfactant to the total of the content (mass %) of the pigment and the content (mass %) of the resin particles is 0.05 or more to 0.17 or less.

15. The image recording method according to claim 8, wherein, in the ink-applying step, the ink is applied by a full-line type recording head.

* * * * *